United States Patent Office 3,564,563
Patented Feb. 16, 1971

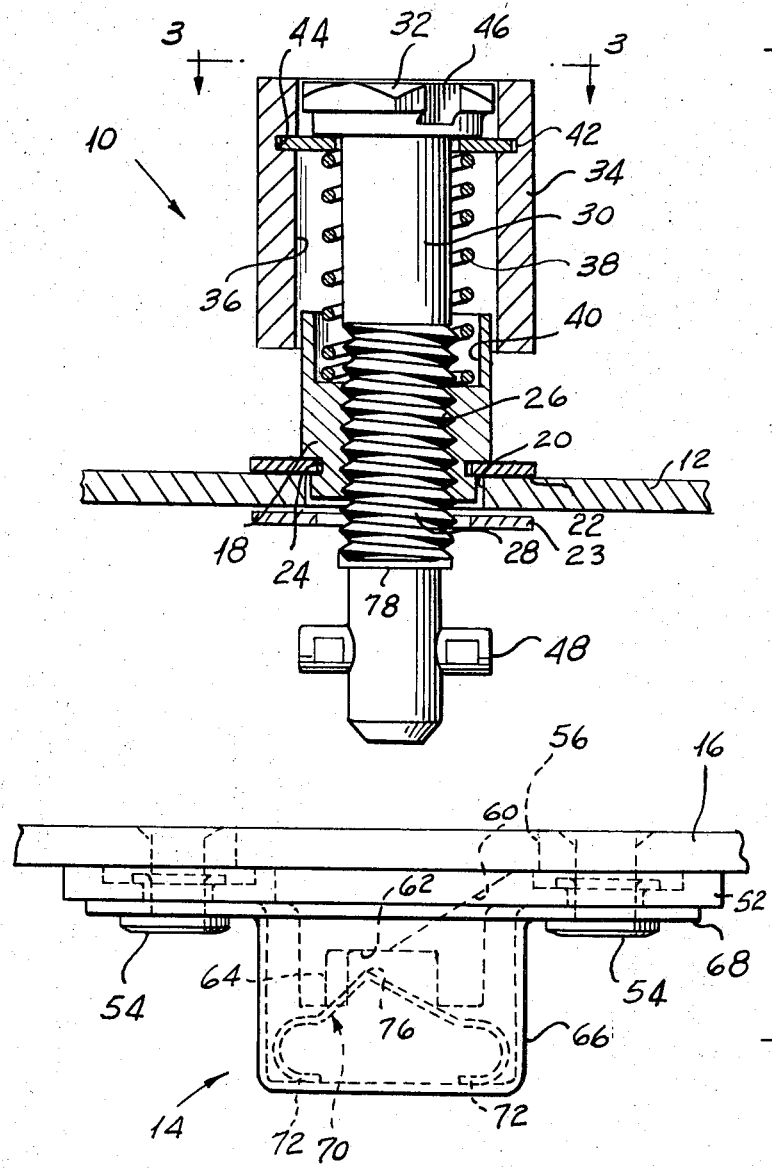
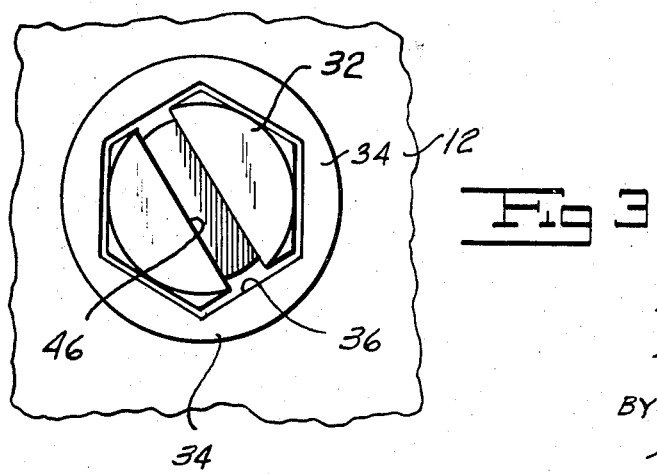

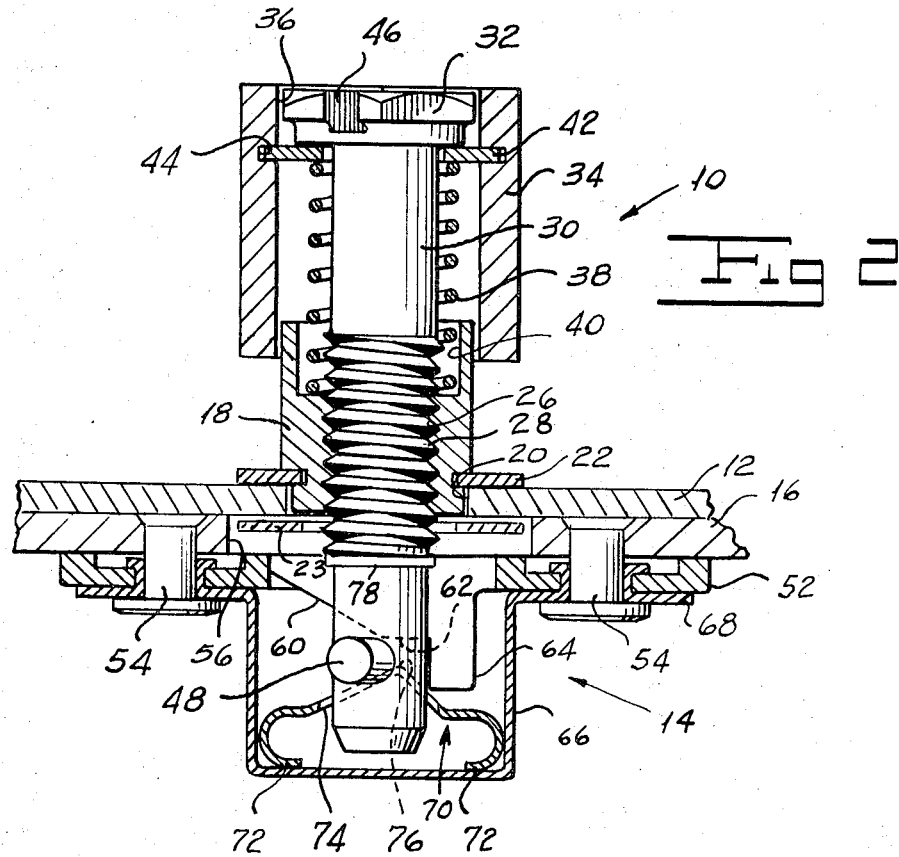
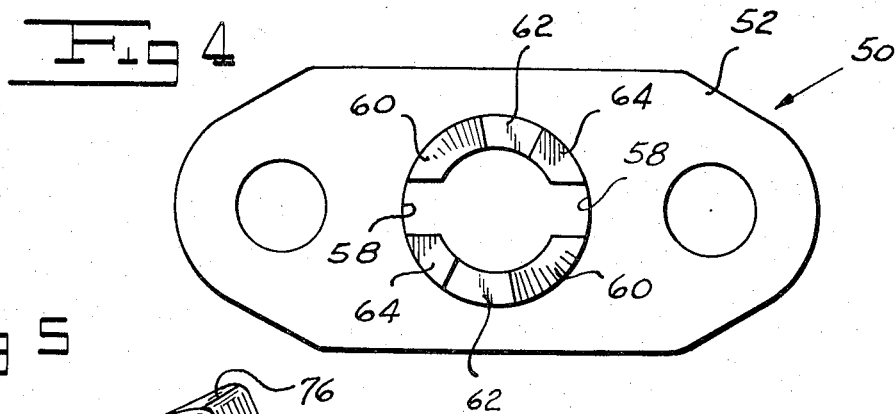
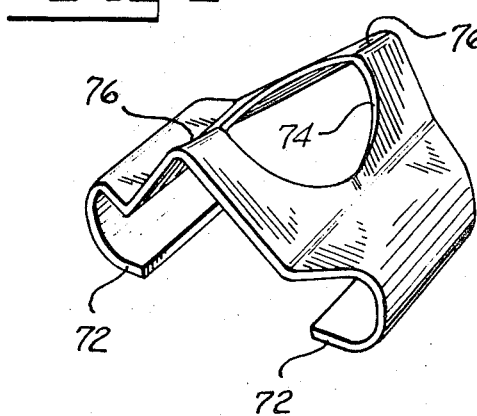

3,564,563
ADJUSTABLE QUICK ACTING FASTENER
Walter Trotter, Fair Lawn, Paul R. Gley, Hillsdale, and Werner Dellith, Ringwood, N.J., assignors to Rex Chainbelt Inc., Milwaukee, Wis., a corporation of Wisconsin
Filed Jan. 9, 1968, Ser. No. 696,545
Int. Cl. A44b 17/00
U.S. Cl. 24—221    7 Claims

ABSTRACT OF THE DISCLOSURE

An adjustable quick acting fastener in which a crosspin stud releasably locked in an axially adjusted position on a nut carried by one of two members to be fastened carries a crosspin, the ends of which are adapted to ride up cam surfaces and onto level surfaces against stops, all provided by a receptacle carried by the other member, in response to rotation of the stud and nut assembly. A spring held in operative relationship with the receptacle by a cover has locking detents which snap behind the ends of the crosspin to hold the stud and nut assembly against accidental reverse rotation after the crosspin ends have been moved into engagement with the stops.

BACKGROUND OF THE INVENTION

There are known in the prior art a variety of quick acting fasteners. One of the most well known of the quick acting fasteners of the prior art is the "quarter turn" fastener in which a stud on one of two members to be fastened carries a crosspin. The other of the two members has a receptacle into which the crosspin may be moved in an axial direction. With the crosspin in the receptacle the stud is rotated to move the crosspin ends upwardly along cam tracks of the receptacle to draw the parts together. At the ends of the cam tracks the crosspin ends ride over detents and into recesses against stops. Usually a spring biases the stud in a direction to hold the crosspin ends in the receptacle recesses.

While quick acting fasteners of the quarter turn type have long been used successfully to hold parts in assembled relationship, they incorporate a number of disadvantages. First, the fasteners are not adjustable. A very large variety of different lengths of studs is required to accommodate a range of panel thicknesses. Secondly, there is no provision made in quarter turn fastener structures of the prior art for readily adjusting the force with which the two parts are held together. Another distinct disadvantage of quarter turn fasteners of the type known in the prior art is the axial relaxation of the clamping force when the crosspin ends ride over the detents and fall into the recesses. This disadvantage is most serious in an application in which a gasket must be held clamped for a pressure seal or where an electrical or radio-frequency shield must be effected by use of the fastener.

We have invented an adjustable quick acting fastener which overcomes the defects of quick acting fasteners of the prior art. With our fastener a given stud is able to accommodate a range of panel thicknesses. The force exerted by our fastener is readily adjustable to a fine degree. Our fastener is especially adapted for use in installations where a pressure seal is to be provided. There is no relaxation of the holding force when our fasteners operate.

SUMMARY OF THE INVENTION

One object of our invention is to provide an adjustable quick acting fastener which overcomes the disadvantages of quick acting fasteners of the prior art.

Another object of our invention is to provide a quick acting fastener which permits a given stud to accommodate a range of panel thicknesses.

A further object of our invention is to provide an adjustable quick acting fastener in which the force exerted by the fastener is readily adjustable to a fine degree.

Still another object of our invention is to provide a quick acting fastener in which there is no axial relaxation of clamping force when the fastener is locked up.

A still further object of our invention is to provide a quick acting fastener which is especially adapted for use in installations wherein a pressure seal is to be provided.

Other and further objects of our invention will appear from the following description.

In general our invention contemplates the provision of a quick acting fastener in which a stud threaded on a nut carried by one of the two members to be joined is releaseably locked in an axially adjusted position with respect to the nut. A crosspin on the end of the stud is adapted to be inserted into a receptacle and then moved along cam tracks of the receptacle to level surfaces and against stops at the ends of the surfaces in response to rotation of the stud. A detent spring in the receptacle assembly snaps behind the crosspin when the latter is against the stops to prevent accidental release of the fastener.

BRIEF DESCRIPTION OF THE DRAWINGS

In the accompanying drawings which from part of the instant specification and which are to be read in conjunction therewith and in which like reference numerals are used to indicate like parts in the various views:

FIG. 1 is an elevation of the fastener and receptacle assembly of our quick acting fastener with parts shown in section and in the relative positions of the parts before they are joined.

FIG. 2 is a sectional view of our adjustable quick acting fastener with the parts engaged.

FIG. 3 is a top plan view of our quick acting fastener taken along the line 3—3 of FIG. 1.

FIG. 4 is a bottom plan view of the receptacle of our quick acting fastener detached from the rest of the parts.

FIG. 5 is a perspective view of the detent spring of our quick acting fastener.

DESCRIPTION OF THE PREFERRED EMBODIMENTS

Referring now to the drawings, our quick acting fastener includes a crosspin stud and nut assembly, indicated generally by the reference character 10, carried by one member 12 of the two members to be joined by the fastener. The fastener also includes a receptacle assembly, indicated generally by the reference character 14, supported on the other member 16 of the two members to be joined.

The stud and nut assembly 10 includes a nut 18, the lower end of which is received in an opening 20 in the member 12. A snap ring 22 fits into an annular groove 24 in the outer surface of the nut 18 and engages the upper surface of the member 12 to provide a bearing for the crosspin assembly 10 when it is operated in a manner to be described. A retaining split washer 23 around stud 30 below panel 12 prevents the assembly 10 from falling out of opening 20 and away from panel 12. The nut 18 has an internally threaded portion 26 which receives the threaded shank portion 28 of crosspin stud 30.

Nut 18 has a non-circular cross-sectional shape such, for example, as hexagonal. We provide the stud 30 with a head 32, which also may be hexagonal. A sleeve or cover 34 has an opening 36 of a cross-sectional shape corresponding to the shape of nut 18 and of the head 32. A spring 38 surrounding the stud shank 30 bears between the bottom of a recess 40 in nut 18 above the threads 26 and a snap ring or washer 42 received in an annular recess 44 in sleeve 34 normally to urge the sleeve to the position shown wherein the nut 18 and the stud 30 are positively locked against relative rotary movement.

With the assembly 10 disassembled from the panel 12, sleeve 34 can be moved downwardly against the action of spring 38 to expose head 32. With the head exposed the stud 30 can be rotated with respect to the nut 18 to adjust the position of the stud axially with relation to the nut. Conveniently this may be accomplished manually. Adjacent its end remote from the head 32, stud 30 carries a crosspin 48.

The receptacle assembly 14 of our fastener includes a receptacle, indicated generally by the reference character 50, having a base 52 provided with openings for the reception of rivets 54 or the like for securing the receptacle to the member 16 in alignment with an opening 56 in the member 16. The central portion of the receptacle 50 is so formed as to provide openings 58 through which the ends of the crosspin 48 may pass when the stud is moved into the receptacle. Generally straight cam tracks 60 lead away from the base 52 toward level track portions 62 at the ends of which we provide receptacle stops 64. From the structure just described it will be seen that with stud 30 properly axially adjusted when the crosspin moves through the openings 58 and the stud 30, the nut 18, and the cover 34 are rotated as a unit, the ends of the crosspin 48 ride along tracks 60 onto surfaces 62 and into engagement with stops 64.

We provide the receptacle assembly 14 with a cover 66 having a base 68 formed with grommet portions extending through the rivet openings in the receptacle base 52 to hold the cover in position on the receptacle. Cover 66 serves to position a detent spring 70 to lock the crosspin 48 in place when the fastener has been moved to a position at which the crosspin 48 engages the stops 64. Particularly the spring 70 includes bends 72 which engage cover 66 to hold the spring in place. We provide the spring with a central opening 74 through which the end of the stud 30 beyond crosspin 48 can extend. Respective detent portions 76 of the spring 70 are adapted to snap into position behind the ends of the crosspin 48 as the latter move to positions at which they engage the stops 64.

Preferably we provide a stop 78 at the lower end of the threads 28 to limit the adjusting movement of the stud. This may conveniently be accomplished by deforming some of the lowermost threads of the portion 28.

In use of our adjustable quick acting fastener, we select a stud 30, the length of which is adapted to be used with members 12 and 16 having an aggregate thickness within a certain range of thicknesses. Having thus selected a stud of a length suitable for accommodating an aggregate thickness within a certain range, we first adjust the position of the stud 30 with relation to the nut 18 so that the distance between the top of the crosspin 48, as viewed in FIG. 1, and the underside of the panel 12 is approximately equal to the distance between the surfaces 62 of the receptacle and the upper surface of the frame member 16. In order to make this adjustment, the sleeve 34 is pushed downwardly as viewed in FIG. 1 against the action of spring 38 until the head 32 is exposed. In this position of the parts, the stud 30 may be rotated with respect to the nut either to move the stud further down so as to increase its effective length or to move the stud up to decrease its effective length.

When the adjustment just described has been made sleeve 34 is released and it snaps back to the position shown in FIG. 1. In this position of the sleeve, its non-circular opening or bore 36 covers head 32 and a portion of nut 18, both of which have corresponding non-circular cross sections. It will be seen that with the parts in this position, stud 30 is positively locked against movement with relation to the nut 18.

To assemble the members 12 and 16, stud 30 is moved into the receptacle with the crosspin ends moving through the slots 58 to positions at which they can engage cam tracks 60. The assembly 10 then is rotated in such a direction as to cause the ends of crosspin 48 to ride up tracks 60 and onto the levers 62 and against stops 64. In the course of this movement, the crosspin ends ride over the detents 76 which snap into position behind the crosspin ends releasably to lock stud 30 against reverse rotary movement. It will be seen that detents 76 provide the desired locking action without any axial relaxation of the clamping force as occurs with fasteners of the quick acting type known in the prior art.

As the ends of the crosspin 48 ride up the tracks 60, parts 12 and 16 are drawn tightly together. If for any reason it becomes desirable to change the clamping force such, for example, as to increase the pressure on a gasket (not shown) disposed between members 12 and 16, the fastener may be released by rotating assembly 10 in the reverse direction against the action of detents 76. When that has been done, the effective length of stud 30 can be finely adjusted merely by moving sleeve 34 to expose head 32 to permit the stud to be rotated with respect to the nut 18.

It will be seen that we have accomplished the objects of our invention. We have provided a quick acting fastener which is adjustable. Our fastener permits a stud of a given length to accommodate a range of panel thicknesses. Our stud avoids the axial relaxation pin lockup which occurs in quick acting fasteners of the prior art. Our quick acting fastener is especially adapted for use in installations wherein gaskets or the like are to be compressed to provide seals. Our adjustable quick acting fastener permits the clamping force to be readily adjusted to a fine degree.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specfiic details shown and described.

Having thus described our invention, what we claim is:

1. In a fastener an assembly for adjusting the effective length of the fastener including in combination, a stud having a head end and having a shank provided with a threaded portion extending from said head toward the other end of said stud, a receptacle engaging element carried by said other end of said stud, a nut threadably carried by the threaded portion of said shank, a locking element carried by said shank adjacent said head end for axial movement between a first position and a second position, first interengageable means on said element and on one of said head end of said shank and said nut comprising surface surfaces extending parallel to the longitudinal axis of the fastener for preventing relative rotation therebetween in said first and second positions of said element, second interengageable means on said element and on the other of said head end of said shank and said nut for positively preventing relative rotation in either direction therebetween in said first position of said element while permitting relative rotation therebetween in the second position of the element and means for biasing said element to said first position.

2. An assembly as in claim 1 in which said element is a sleeve.

5. An assembly as in claim 4 in which said biasing is a sleeve and in which said second interengageable means comprises a head of non-circular cross sectional shape on the head end of said shank and a portion of said sleeve of interior non-circular cross sectional shape for cooperating with said head.

4. An assembly as in claim 1 in which said element is a sleeve having a bore with a non-circular cross-sectional shape, said first interengageable means comprising a portion of said sleeve and a nut having a portion formed with a non-circular cross sectional shape for engaging the bore of said sleeve in said first and second positions and in which said second interengageable means comprises another portion of said sleeve and a head having a non-circular cross sectional shape carried by the head end of said shank for engaging said sleeve bore.

5. An assembly as in claim 4 in which said biasing means comprises an element extending radially inwardly of said sleeve bore at a location intermediate the ends thereof and a spring biased between said nut and said radially inwardly extending element.

6. A receptacle assembly for use with a stud having a crosspin thereon including a rigid receptacle having a base with an opening for receiving said stud, said base having generally oppositely disposed slots extending outwardly from said opening for admitting the ends of said crosspin, said rigid receptacle being formed with respective oppositely directed cam tracks leading from said slots to level surfaces spaced from said base and respective stops at the ends of said surfaces remote from said cam tracks, a spring element separate from said receptacle formed with detents, a housing secured to said receptacle for positioning said spring element with said detents extending towards the level surfaces at locations between the ends of said cam tracks and said stops.

7. A fastener for securing a first member to a second member including in combination, a stud assembly rotatably carried by one of said members, said stud assembly including a shank having a head end and a portion provided with threads extending from said head end toward the other end of said shank, a crosspin carried by the other end of said shank, a nut threadably carried by the threads of said shank, a locking element carried by said shank adjacent said head for axial movement between a first position and a second position, first interengageable means on said element and on one of said head end of said shank and said nut for preventing relative rotation therebetween in said first and second positions of said element, second interengageable means on said element and on the other of said head end of said shank and said nut for preventing relative rotation therebetween in said first position of said element while permitting relative rotation therebetween in the second position of the element, and means for biasing said element to said first position, and a receptacle assembly secured to the other member, said receptacle assembly comprising a rigid receptacle having a base, with an opening for receiving said shank, said base having generally oppositely directed slots extending outwardly from said opening for admitting the ends of said crosspin, said receptacle being formed with respective oppositely directed cam tracks leading from said slots to level surfaces spaced from said base and respective stops at the ends of said surfaces remote said cam tracks, a spring element formed with a pair of detents and a housing secured to said base for positioning said spring element with said detents directed to said level portions of said surfaces at locations between the ends of said cam surfaces and said stops.

References Cited

UNITED STATES PATENTS

| | | | |
|---|---|---|---|
| 698,974 | 4/1902 | Furst | 151—28 |
| 2,305,572 | 12/1942 | Johnson | 24—221.2UX |
| 2,309,737 | 2/1943 | Murphy | 24—221.2UX |
| 2,369,297 | 2/1945 | Johnson | 24—221.2UX |
| 2,486,670 | 11/1949 | Nigg | 24—221.2UX |
| 2,515,510 | 7/1950 | Griffin | 24—221.2UX |

FOREIGN PATENTS

| | | | |
|---|---|---|---|
| 141,149 | 5/1951 | Australia | 24—221.2 |
| 8,801 | 5/1891 | Great Britain | 151—28 |

BERNARD A. GELAK, Primary Examiner

U.S. Cl. X.R.

151—28, 69

PO-1050
(5/69)

UNITED STATES PATENT OFFICE
CERTIFICATE OF CORRECTION

Patent No. 3,564,563    Dated February 16, 1971

Inventor(s) Walter Trotter, Paul R. Gley and Werner Dellith

It is certified that error appears in the above-identified patent and that said Letters Patent are hereby corrected as shown below:

Column 4, line 53,
        delete "surface"

line 65,
    "5" and "4" should be -- 3 -- and --1-- line 65
    "biasing" should be -- element --

Signed and sealed this 3rd day of August 1971.

(SEAL)
Attest:

EDWARD M. FLETCHER, JR.        WILLIAM E. SCHUYLER, JR.
Attesting Officer             Commissioner of Patents